United States Patent [19]

Gielen

[11] Patent Number: 5,025,837
[45] Date of Patent: Jun. 25, 1991

[54] APPARATUS FOR MEASURING LOOM WARP TENSION

[75] Inventor: Markus Gielen, Sigmarszell, Fed. Rep. of Germany

[73] Assignee: Lindauer Dornier Gesellschaft mbH, Lindau, Fed. Rep. of Germany

[21] Appl. No.: 485,040

[22] Filed: Feb. 26, 1990

[30] Foreign Application Priority Data

Feb. 25, 1989 [DE] Fed. Rep. of Germany ....... 3905881

[51] Int. Cl.$^5$ .................... D03D 49/18; G01L 5/04
[52] U.S. Cl. ........................................ 139/35; 73/159
[58] Field of Search ................. 139/304, 308, 99, 110, 139/311, 97, 35; 73/159, 862.41

[56] References Cited

U.S. PATENT DOCUMENTS

| | | | |
|---|---|---|---|
| 3,850,031 | 11/1974 | Schwenzfeier et al. | 73/159 X |
| 3,878,872 | 4/1975 | Hintsch | 139/110 X |
| 4,572,243 | 2/1986 | Feliz | 139/97 |
| 4,794,802 | 1/1989 | Felix | 73/862.41 |

Primary Examiner—Andrew M. Falik
Attorney, Agent, or Firm—W. G. Fasse

[57] ABSTRACT

The warp tension is measured in a weaving loom by measuring the fabric tension downstream of the beat-up point. For this purpose a measuring device is arranged in a suitable position downstream of the beat-up point. Such an arrangement is possible because the fabric tension in the take-up direction is directly proportional to the warp tension. The measuring device includes a measuring beam supported, for example, in the spreader bar or pipe. The measuring beam is in contact with the fabric and cooperates with sensor elements such as foil strain gages, pressure gages, or other suitable sensors or pick-ups such as displacement pick-ups. This type of arrangement has the advantage that the warp thread tension can be measured with high precision due to the mentioned proportionality and independently of temperature influences. Additionally, impairment of, or damage to the warp threads is avoided by measuring downstream of the beat-up point.

7 Claims, 3 Drawing Sheets

APPARATUS FOR MEASURING LOOM WARP TENSION

FIELD OF THE INVENTION

The invention relates to an apparatus for measuring the warp tension in weaving looms, whereby in accordance with such tension of the warp threads a measuring device is exposed to a pressure or a force.

BACKGROUND OF THE INVENTION

Devices for measuring the warp tension in weaving looms are necessary, mainly for two purposes. In connection with the closed loop control of the warp tension the measurement is required to assure always an advantageous tension on the warp threads with due regard to the type of fabric to be produced. The measurements are also necessary to make sure that rupture of the warp threads is avoided.

It is known to ascertain the warp thread tension by way of a pressure measurement, whereby a pressure sensitive hose is arranged across the warp thread direction, whereby the pressure sensitive hose lies between the warp threads in such a manner that a portion of the warp threads is guided around the top surface of the pressure sensitive hose while another portion of the warp threads is guided around the underside of the pressure sensitive hose. The tension on the warp threads applies pressure to the pressure sensitive hose and such pressure is approximately proportional to the tension on the warp threads. The so ascertained pressure or tension of the warp threads may be indicated or it may be used in connection with a measuring device for a steady closed loop control or follow-up control of the tension on the warp threads.

However, the compression ratios or values ascertained as just described are subject to the disadvantage that they depend on the looping angle of the warp threads around the sensor hose. Additionally, the so ascertained values depend on the prevailing temperature so that the warp thread tension is ascertained only relatively inaccurately not to mention possible impairments of the warp threads.

Another known method for measuring the warp thread tension is directed to measuring the force which is applied by the warp threads to the backrest or back rail. The backrest or back rail serves in a known manner as a guide means for the warp threads which thus exert a certain compression force on the back rest depending on the tension of the warp threads.

It is a disadvantage of the just mentioned measuring method that it also depends on the looping angle of the warp threads around the backrest with the further complication that this looping angle changes continuously during the weaving due to the fact that the warp threads are taken off from the warp beam. As a result, a substantial measuring error may occur.

Another known apparatus for measuring the warp thread tension comprises means for guiding one or several warp threads along a meandering path formed between three measuring rollers. In this manner it is possible to measure the pressure that is exerted by the warp thread on the measuring rollers which are deflected by such pressure. A disadvantage of this type of measuring resides in the fact that the increased friction of the warp thread or threads within the meandering measuring path may influence the measurement. Another disadvantage is seen in that the warp thread passing through the tension measuring rollers may break due to the increased friction, thereby causing a time consuming repair of the broken warp thread and a reinsertion into the measuring device.

OBJECTS OF THE INVENTION

In view of the foregoing it is the aim of the invention to achieve the following objects singly or in combination:

to further develope an apparatus for measuring the warp thread tension in weaving looms in such a way that such tension can be measured with a substantially larger precision independently of temperature influences and substantially independently of any looping angle of the warp threads around a measuring device;

to construct the apparatus in such a way that it works reliably and repeatedly without interfering with the other operations of a loom;

to achieve a substantially more precise measurement of the warp thread tension than was possible heretofore, without adversely influencing the warp threads;

to make sure that the warp threads, especially when weaving very fine sensitive fabrics, are not exposed to adverse frictional influences; and to install the measuring device for measuring the warp thread tension in such a way that the measuring device cannot be damaged on the one hand, and so that it is easily accessible for maintenance without interfering with the other operations of the loom.

SUMMARY OF THE INVENTION

According to the invention the measuring device is arranged in the zone of the finished fabric downstream of the beat-up point of the fabric, whereby the fabric tension, which is proportional to the warp thread tension, is measured downstream of the beat-up point. Thus, it is essential to the invention that contrary to previous measurements performed directly in the warp thread area, the measurement is now made in the area of the finished fabric downstream of the beat-up point. By arranging the measuring device downstream of the beat-up point, it is possible to obtain the warp thread tension, by measuring the fabric tension because as mentioned the fabric tension in this area is directly proportional to the warp thread tension. By "directly proportional" is meant that the measured fabric tension provides information that can be used directly for the above mentioned purposes just as the warp thread tension. This arrangement of the measuring device also has the advantage that it does not adversely influence or impair the warp threads. Additionally, a substantially more precise measurement of the weft thread tension is possible according to the invention than was possible heretofore.

The measurement of the fabric tension as taught herein is also independent of the looping angle at the backrest or back rail. This is important because heretofore the looping angle at the backrest was essential and could nevertheless falsify the measuring result. Another advantage of the invention is seen in that the present measuring device itself is relatively independent of temperature influences. Further, the arrangement of the measuring device downstream of the beat-up point in the area of the fabric, does not interfere with the weaving operation, nor does it hinder the operator.

Another advantage of the measuring device according to the invention is seen in that adverse friction influences have been avoided. This is especially important for sensitive fine fabrics. The apparatus according to the invention can be so constructed that in addition to the measurement of the fabric tension, it also serves as the guide for the fabric which is necessary anyway for guiding the finished fabric onto a cloth beam. Thus, according to the invention, additional guide rollers in this area and other guide means for the fabric have been obviated.

Further, the measuring device according to the invention can be installed in a fixed position in the loom, whereby the danger of damage to the measuring device is substantially avoided.

According to the invention a plurality of measuring principles may be employed, two of which are especially preferred. One measuring method relates, according to claim 2, to the measuring of the bearing forces effective on a shaft arranged downstream of the beat-up point. The other measuring method relates to the measuring of the compression effective on a jacket surface of a shaft downstream of the beat-up point, whereby the fabric loops at least partially around that shaft. For reasons of simplicity, the spreader shaft itself is used as the location for the measuring device.

According to a preferred embodiment of the present invention the present apparatus for measuring the fabric tension comprises a pipe of approximately cylindrical configuration and having in its jacket surface an elongated groove in which a measuring beam is arranged which extends with its surface approximately flush with the jacket surface of the cylindrical pipe. According to a further embodiment of the invention the edges of said measuring beam extending along the edges of the groove are tapering somewhat downwardly, that is, these edges extend down to a level below the top edge of the cylindrical pipe. The central portion of the measuring beam extends to a level approximately even with the generatrix of the cylinder shaped pipe. This feature makes sure that the measuring beam is exposed to pressure only along substantially a line, namely in the area defined by its central ridge line. The contact between the central surface or ridge line of the measuring beam and the fabric is to be viewed as an ideal because in reality there is a certain small looping angle of the fabric around the measuring beam. Stated differently, the fabric running over the measuring beam is preferably carried by a central section of the measuring beam while the outer edges of the measuring beam are not in contact with the fabric and hence are not exposed to compression by the fabric.

According to a preferred embodiment of the invention the measuring beam has a length of about 150 mm. This dimension is advantageous because it easily accommodates standardized force measuring pick-ups such as foil strain gages.

Depending on the density of the fabric, the number of warp threads already woven into the fabric and running across the measuring beam is within the range of about 30 to 1000 warp threads.

However, the measuring beam may have a length other than the above mentioned preferred length. If a measuring beam longer than 150 mm is used, care must be taken to make the measuring beam sufficiently stiff to make sure that the force exerted by the fabric on the measuring beam is properly introduced into the respective strain gage or other pick-up or sensor.

In an embodiment employing a measuring beam shorter than 150 mm, the forces effective on the measuring beam are smaller and thus the measuring device becomes less sensitive. Additionally, it is possible that the measuring over a shorter length may not yield a representative measurement for the overall fabric tension.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
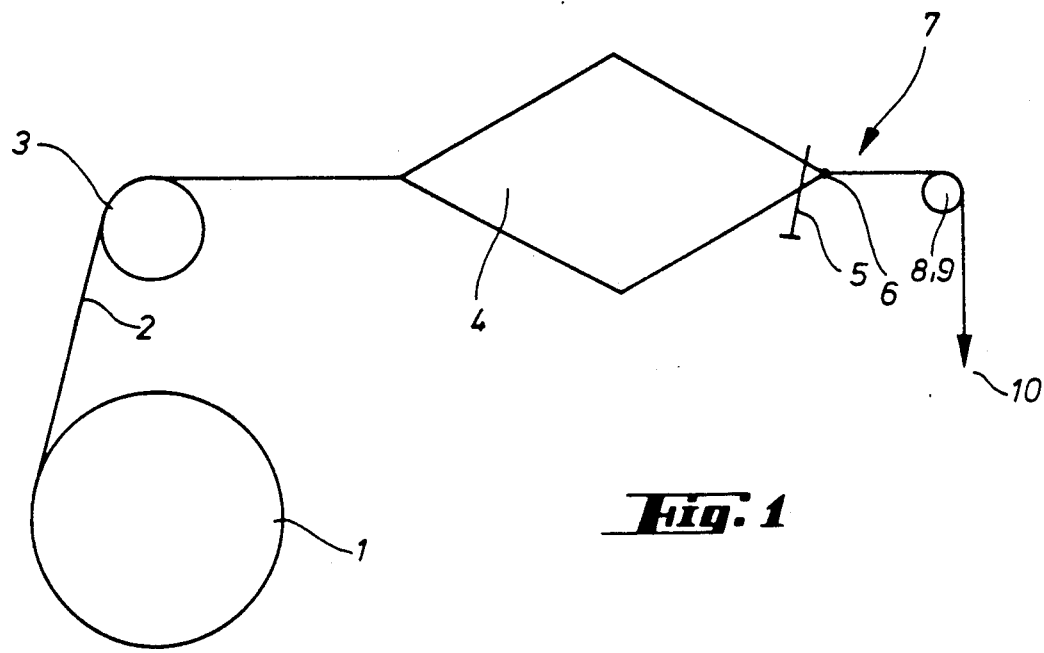
FIG. 1 is a schematic side view of a loom operation illustrating the formation of the loom shed and the beat-up point.

FIG. 1 shows how the warp thread 2 is taken off the warp beam 1 and guided over the backrest or back rail 3. The loom shed 4 is formed in a conventional manner and the reed 5 is conventionally arranged as shown so that the beat-up point or line 6 formed just downstream of the reed 5. Downstream of the beat-up point or line 6 the fabric 7 is pulled in the direction 10 over a spreader shaft 8 in which a measuring device 9 according to the the invention is incorporated as will be described in more detail below. The means for taking up the finished fabric are conventional and hence not shown.

The arrangement of the measuring device 9 in the spreader shaft 8 is a preferred embodiment, however, it is quite possible to arrange the measuring device 9 in the area between the spreader shaft 8 and the beat-up point, or line 6.

According to still another embodiment of the invention the measuring device 9 is arranged downstream of the spreader shaft 8, that is between the spreader shaft 8 and the fabric take-up device pulling in the direction 10. The operation is substantially the same in all embodiments.

It is essential, however, that the fabric is guided over the measuring device 9 so that a certain force is exerted by the fabric on the measuring device 9. The direction of the force exerted on the measuring device 9 should preferably be perpendicularly to the moving direction of the fabric, or at least it should be approximately perpendicular thereto.

The measuring device 9 causes a slight deflection of the finished fabric around the measuring device 9 so that a force can be exerted on the force sensitive elements of the measuring device 9.

The invention achieves the important advantage that any disturbance in the warp thread run that is upstream of the loom shed 4 toward the warp beam 1 is avoided because the measuring device is not arranged in this area. A further advantage is seen in that only a small looping angle around the measuring device is required. It has been found that such a small looping angle does not cause any disturbance to the finished fabric because the sensitive warp threads do not have to run over such a measuring device. Rather, the more stable finished fabric runs over the measuring device according to the invention and the stability of the fabric makes it less prone to disturbances. Even if a weft thread should break, it will alone not influence the measurement.

The preferred embodiment of the invention in which the measuring device 9 is arranged directly inside the spreader shaft 8, has the advantage that the directional change that is imposed by the spreader shaft 8 onto the finished fabric, takes place anyway and that the invention now uses this directional change in the fabric for the measurement.

Figure 2:
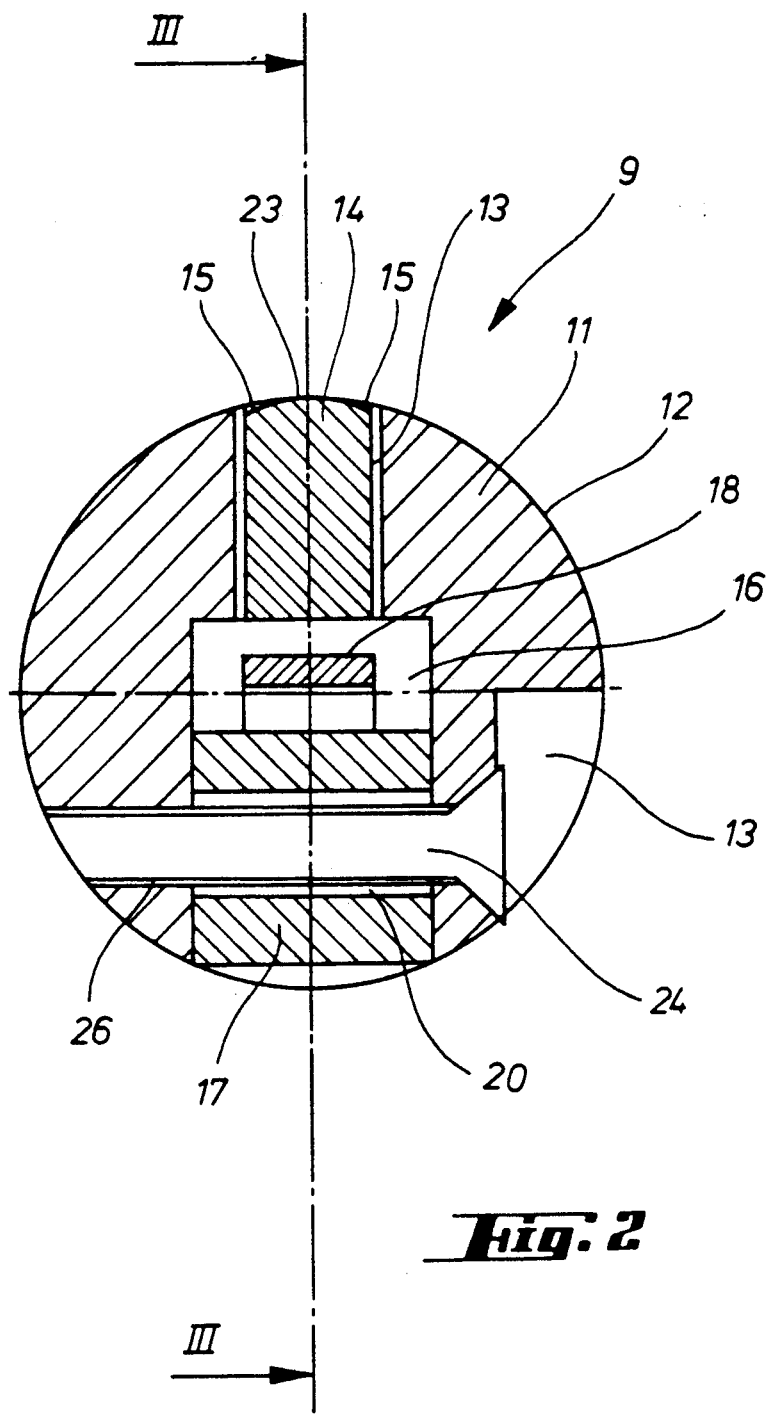
FIG. 2 shows a sectional view through the measuring device according to the invention.

FIG. 2 shows a cross-section through the measuring device 9 according to the invention. The present device comprises a pipe 11 having a jacket surface 12 of cylindrical shape. A groove 13 extends radially into the pipe 11. Incidentally, although reference is made to a "pipe" a solid bar could also be used and the groove 13 is then cut into this bar.

The jacket surface 12 of the pipe or bar 11 does not necessarily have to be cylindrical. The jacket surface may have an elliptical curve. It is, however, required that the jacket surface 12 has a sufficient curvature to function as the travel direction changing spreader bar. Further, the groove 13 must be sufficient for the mounting of the measuring beam 14.

Figure 4:
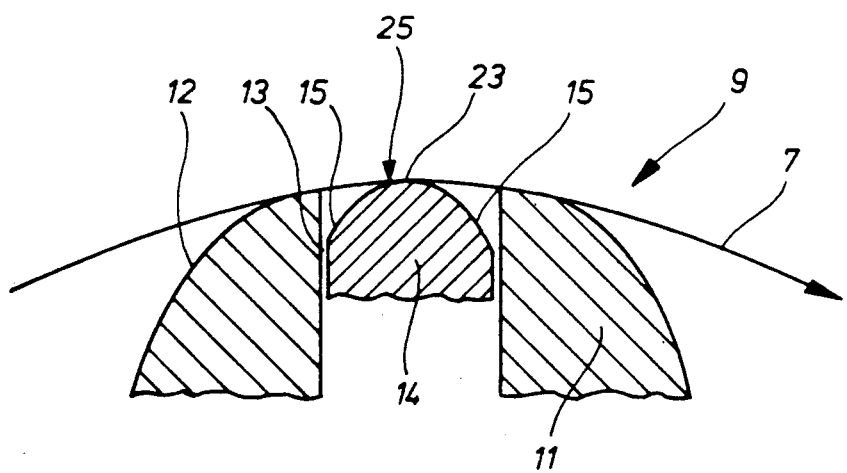
FIG. 4 shows a somewhat schematic section of an enlarged view of the upper portion of the measuring device.
Figure 3:
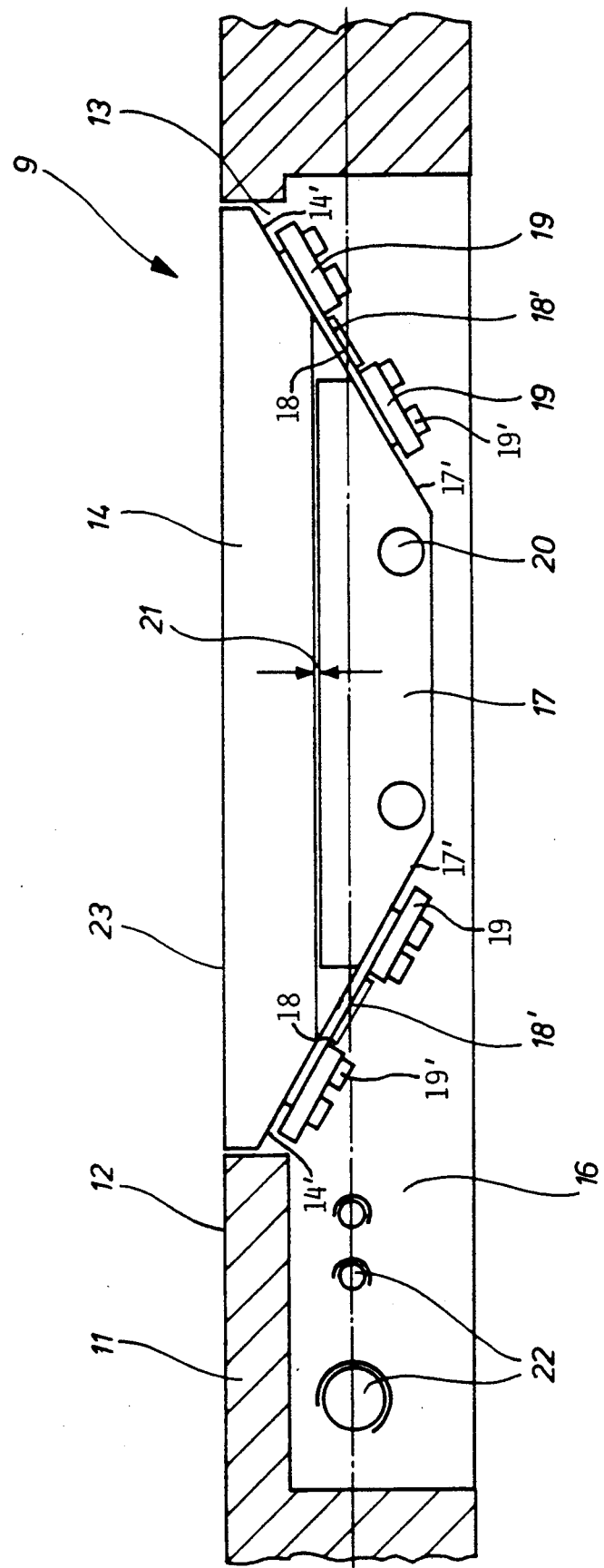
FIG. 3 shows a sectional view along section line III—III in FIG. 2.

FIGS. 2, 3, and 4 illustrate a preferred embodiment in which the measuring beam 14 is a profiled bar made of aluminum, steel, or even a synthetic material. It is important, however, that the surface 23 of the measuring beam 14 is machined or polished so that the surface 23 has a small friction, thereby avoiding any unpermissible wear and tear on the finished fabric.

The contour of the surface 23 as shown in FIG. 4 is machined in such a way that a central zone 25 extends approximately flush with the jacket surface 12 of the spreader bar 11. Thus, an undisturbed travel of the fabric is assured because the fabric 7 runs, as shown in FIG. 4, over the bar sections on both sides of the measuring beam 14. Additionally, the fabric contacts the measuring beam 14 only over a relatively narrow strip 23 along the length of the measuring beam 14 to the right and left of its center line. This feature makes sure that the force to be measured is introduced centrally and with a defined direction into the measuring beam 14.

Preferably, the edges 15 of the measuring beam 14 are tapered downwardly to a level below the edges along the groove 13 in the spreader bar 11. Thus, the edges 15 of the beam do not contact the fabric 7.

According to FIGS. 2 and 3, the measuring beam 14 is arranged with a certain play 21 above a carrier 17. The play is preferably within the range of a few 100ths of a millimeter. The connection between the measuring beam 14 and the carrier 17 arranged therebelow is accomplished by two lateral bending beams 18. For simplicity's sake the following description will refer only to one bending beam 18, although there are two such beams as best seen in FIG. 3. Both bending beams 18 for connecting the measuring beam 14 to the carrier 17 are of identical construction.

The bending beam 18 may be made of any suitable steel, aluminum, or synthetic material. A foil strain gage 18' is secured to each bending beam 18, for example, by an adhesive bonding. The foil strain gage 18' extends longitudinally relative to its respective bending beam 18.

The bending beam 18 itself is secured at one end to the measuring beam 18 by a mounting piece 19. The other end of the bending beam 18 is secured to the carrier 17 by a mounting piece 19. Screws 19' may be used to secure the mounting pieces 19 and the bending beam 18 to the measuring beam 14 and to the carrier 17. Threaded bores are provided for this purpose in the beam 14 and in the carrier 17.

As further shown in FIG. 3, it is important that the slanted surfaces 14' of the measuring beam 14 and the slanted surfaces 17' of the carrier 17 are in true accurate alignment with each other so that the respective bending beam 18 can be mounted without any stress and remains free of stress until a fabric runs over the ridge surface 23 of the bending beam 14.

The foil strain gages 18' are connected through electrical conductors to a conventional signal evaluating circuit, including conventional amplifiers, which may be secured to bores 22 in a recess 16 of the pipe or bar 11.

According to FIG. 2 the longitudinal, radially extending groove 13 merges into the just mentioned central recess 16 in which the carrier 17 is secured with suitable mounting elements, for example screws 24 passing through bores 20 in the carrier 17 and into threaded bores 26 in the pipe or bar 11.

Rather than arranging the bending beams 18 at the slant as shown in FIG. 3, it is possible to arrange these bending beams 18 in parallel to the horizontal ridge line 23 of the measuring beam 14. In such an embodiment the bending beams 18 would also extend in parallel to the carrier 17. For example, the bending beams 18 could extend horizontally between small projections facing downwardly of the measuring beam 14 and the carrier 17.

According to yet another embodiment of the invention, the bending beam 18 and the foil strain gages 18' are replaced by pressure sensors arranged in the gap forming the play 21 between the measuring beam 14 and the carrier 17. Instead of using pressure sensors for the foil strain gages 18', it is also possible to use displacement pick-ups, such as inductive placement pick-ups, capacitive displacement pick-ups, or optical displacement pick-ups.

In all of the above described embodiments, it is important, according to the invention, that the fabric tension is measured rather than the warp thread tension and that the fabric tension is measured downstream of the beat-up point in order to achieve the above outlined advantages.

Although the invention has been described with reference to specific example embodiments, it will be appreciated that it is intended to cover all modifications and equivalents within the scope of the appended claims.

What I claim is:

1. An apparatus for measuring a warp thread tension on a weaving loom having a beat-up line, comprising means (9) for measuring a fabric tension which is proportional to said warp thread tension, and means for mounting said measuring means in a zone of a finished fabric (7) downstream of said beat-up line (6) as viewed in a travel direction of said finished fabric, whereby measuring takes place downstream of said beat-up line, and wherein said fabric measuring means (9) comprise an approximately cylinder-shaped member (11) having a jacket surface (12), an elongated groove (13) in said cylinder-shaped member (11), measuring beam means including a measuring beam and sensor means arranged in said groove (13) for sensing said fabric tension, said measuring beam having a surface approximately flush with said jacket surface (12) of said cylinder-shaped member (11), so that said measuring beam can contact said finished fabric.

2. The apparatus of claim 1, wherein said fabric tension measuring means are mounted in a position for measuring the bearing force which are proportional to the warp thread tension, said bearing forces being effective on a shaft arranged in a zone downstream of said beat-up line (6) of the finished fabric (7).

3. The apparatus of claim 1, wherein said measuring beam means has edges (15) tapering downwardly to below an edge of said groove (13).

4. The apparatus of claim 1, wherein said measuring beam means comprise a carrier (17) and a measuring beam (14) arranged with a slight play (21) above said carrier (17), and lateral bending beams (18) securing said carrier and said measuring beam (14) to each other, said sensor means (18′) being operatively secured to said bending beams (18).

5. The apparatus of claim 4, wherein said cylinder-shaped member (11) has a recess (16) below said elongated groove (13), said recess (16) merging as an enlargement into said elongated groove (13), said carrier (17) for said measuring beam (14) being arranged in said recess, and means for securing said carrier in said recess.

6. The apparatus of claim 1, wherein said sensor means comprise strain gage means (18′) for sensing said fabric tension.

7. The apparatus of claim 1, wherein said weaving loom comprises a fabric spreading shaft (8), and wherein said cylinder-shaped member (11) and said measuring beam means form part of said fabric spreading shaft.

* * * * *

UNITED STATES PATENT AND TRADEMARK OFFICE
CERTIFICATE OF CORRECTION

PATENT NO.   : 5,025,837
DATED        : June 25, 1991
INVENTOR(S)  : Markus Gielen It is certified that error appears in the above-identified patent and that said Letters Patent is hereby corrected as shown below:

Column 6, line 63, after "fabric" insert --tension--;
Column 7, line 7,  replace "force" by --forces--.

Signed and Sealed this

Twenty-fourth Day of November, 1992

*Attest:*

DOUGLAS B. COMER

*Attesting Officer*   *Acting Commissioner of Patents and Trademarks*